United States Patent
Ooe

(10) Patent No.: US 9,938,126 B2
(45) Date of Patent: Apr. 10, 2018

(54) LIFTER

(71) Applicant: Daifuku Co., Ltd., Osaka (JP)

(72) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/237,180

(22) Filed: Aug. 15, 2016

(65) Prior Publication Data

US 2017/0050833 A1 Feb. 23, 2017

(30) Foreign Application Priority Data

Aug. 17, 2015 (JP) .................................. 2015-160296

(51) Int. Cl.
 *B66F 17/00* (2006.01)
 *B65G 35/06* (2006.01)
 *B66F 3/22* (2006.01)

(52) U.S. Cl.
 CPC .............. *B66F 17/00* (2013.01); *B65G 35/06* (2013.01); *B66F 3/22* (2013.01); *B65G 2207/40* (2013.01)

(58) Field of Classification Search
 CPC . B66F 17/00; B66F 3/22; B65G 35/06; B65G 2207/40
 See application file for complete search history.

(56) References Cited

U.S. PATENT DOCUMENTS

| | | | | |
|---|---|---|---|---|
| 3,606,255 A * | 9/1971 | Stevens | ................. | B66F 7/0608 254/122 |
| 3,982,718 A * | 9/1976 | Folkenroth | ............ | A61G 15/02 187/269 |
| 4,373,701 A * | 2/1983 | Kishi | ........................ | B66F 3/22 187/243 |
| 4,391,345 A * | 7/1983 | Paul | ...................... | B66F 11/042 182/141 |
| 4,930,598 A * | 6/1990 | Murrill | ................. | B66F 11/042 182/141 |
| 5,105,915 A * | 4/1992 | Gary | ...................... | A61G 3/063 14/71.3 |
| 7,331,425 B2 * | 2/2008 | Bukowski | ................ | B66F 7/18 187/211 |
| 8,733,508 B2 * | 5/2014 | Bacon | ..................... | B66F 7/065 187/240 |

FOREIGN PATENT DOCUMENTS

JP   2012041110 A   3/2012

* cited by examiner

*Primary Examiner* — Anita M King
(74) *Attorney, Agent, or Firm* — St. Onge Steward Johnston & Reens LLC

(57) ABSTRACT

A lifter is provided with operating levers, which, against driving forces of actuators that switch the ratchet pawls to unengaged orientations, switch the ratchet pawls to engaged orientations of being engaged with ratchet gears, is provided with a link mechanism, which, when a workpiece support base is being lowered by collapsing motions of a pair of right and left crosslink mechanisms supporting the workpiece support base and a difference arises in movement amounts of movable support shafts at lower end sides of the respective crosslink mechanisms, converts the movement amount difference to an operating force of the operating lever at the larger movement amount side, and is such that by the operating lever at one side being driven by the link mechanism, the operating lever switches the ratchet pawl at the larger movement amount side to the engaged orientation.

5 Claims, 9 Drawing Sheets

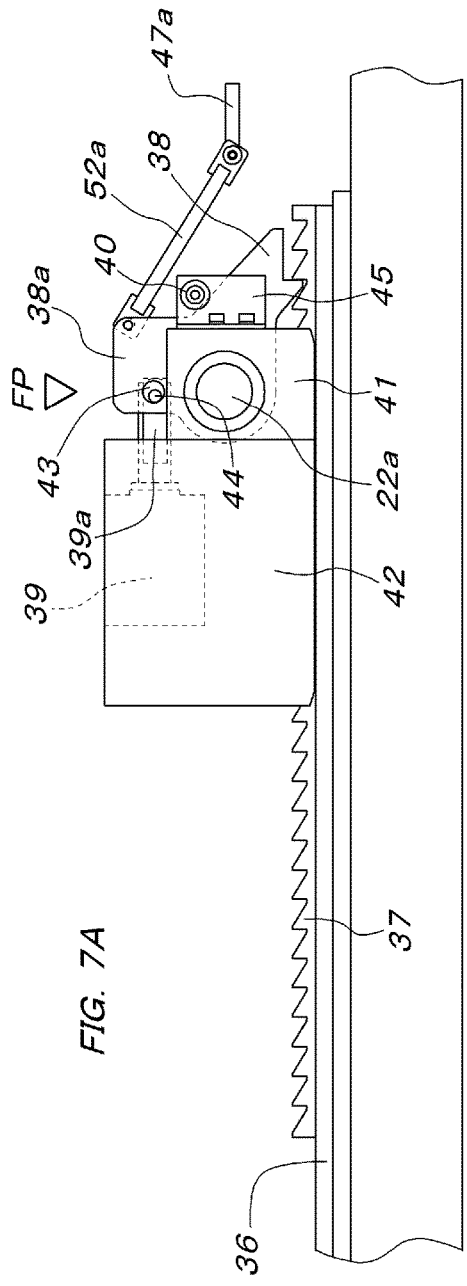
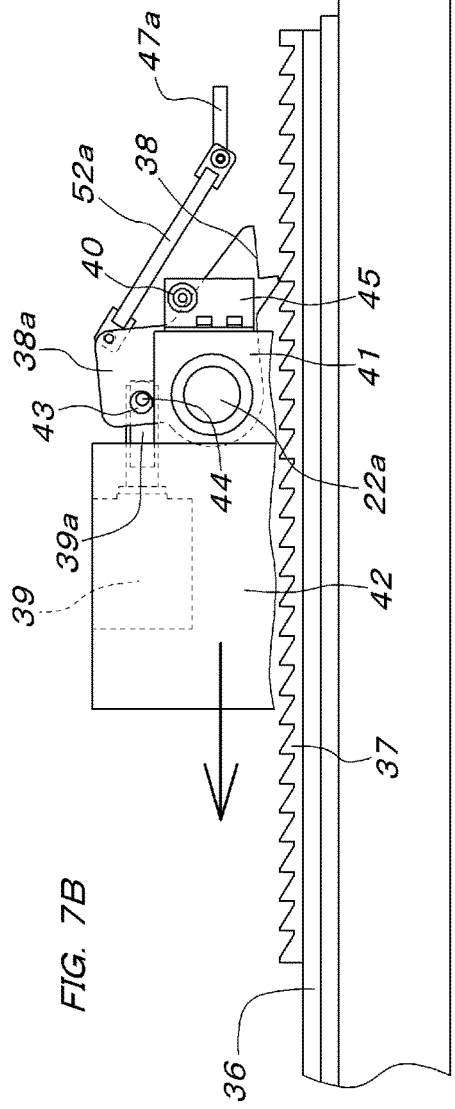

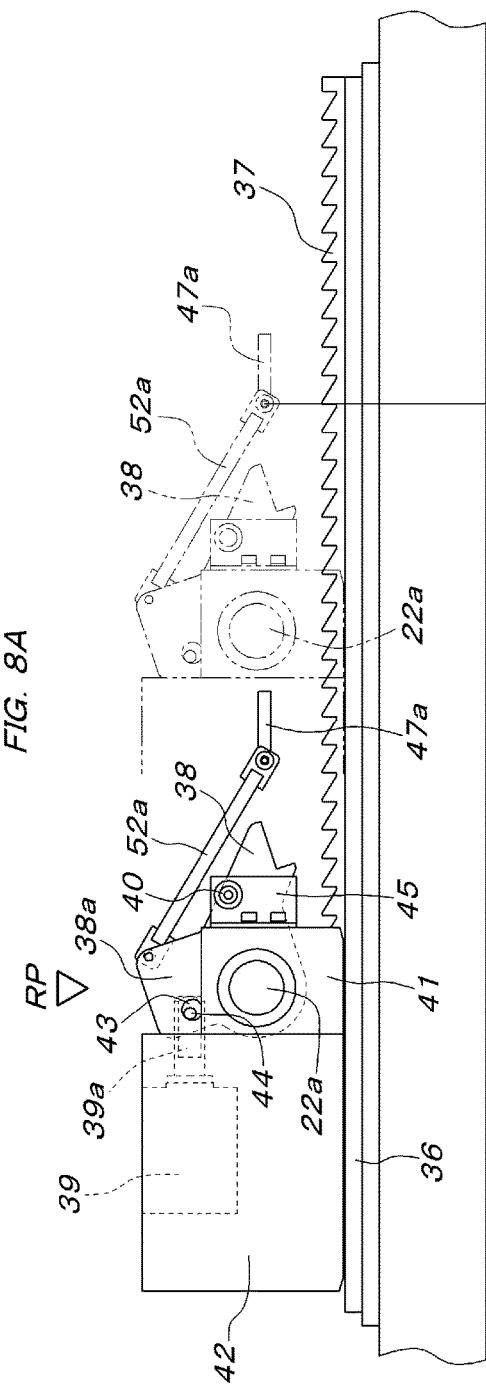

LIFTER

FIELD OF THE INVENTION

The present invention relates to a lifter installed on a conveying traveling body, etc., and utilized as a means to change a support height of a conveyed object.

BACKGROUND OF THE INVENTION

Known lifters for conveying devices can include a workpiece support base, vertically movably supported on a base via a pair of right and left crosslink mechanisms, an elevation/lowering drive means, elevatingly and loweringly driving the workpiece support base, and a pair of right and left fall prevention means, juxtaposed to the respective crosslink mechanisms. The fall prevention means can include a pair of right and left ratchet gears, fixed to movement path flanks of movable support shafts, which are capable of forward/reverse movement, at the base sides of the respective crosslinks. The fall prevention means can also include a pair of right and left ratchet pawls, moving forward and in reverse in interlock with the respective movable support shafts and being engaged with the ratchet gears by urging forces to deter lowering of the workpiece support base, and a pair of right and left actuators, which, when the workpiece support base is lowered, switch and hold the respective ratchet pawls against the urging forces to and in unengaged orientations of being separated from the ratchet gears. Such a lifter is described in Japanese Published Unexamined Patent Application No. 2012-41110 (Patent Literature 1). In Patent Literature 1, a motor-driven screw jack in a horizontal orientation is indicated as the elevation/lowering drive means elevatingly and loweringly driving the workpiece support base. There is also known an elevation/lowering drive means that uses a pair of right and left elevation/lowering drive chains that respectively and separately perform elevation/lowering drive of the pair of right and left crosslink mechanisms.

SUMMARY OF THE INVENTION

The known lifters are configured to elevate/lower the workpiece support base by making the pair of right and left crosslink mechanisms operate to rise and collapse by means of the elevation/lowering drive chains as described above. While sudden lowering, that is, falling of the workpiece support base can be deterred by the fall prevention means during elevation of the workpiece support base, when the elevation/lowering drive chains are driven in a direction to lower the workpiece support base, the ratchet pawls of the fall prevention means are switched to and held in the unengaged orientations by the actuators and therefore when the elevation/lowering drive chains break during the lowering of the workpiece support base, the fall prevention means will not be effective and this may lead to a serious accident.

The present invention proposes a lifter capable of solving the problems of the conventional art such as the above. The lifter is described by providing reference symbols in parentheses used in the description of embodiments below to facilitate understanding the relationship with the embodiments. The lifter according to the present invention includes a workpiece support base (14), vertically movably supported on a base (12) via a pair of parallel crosslink mechanisms (13A, 13B), elevation/lowering drive chains (30a, 30b), juxtaposed to the respective crosslink mechanisms (13A, 13B) and elevatingly and loweringly driving the workpiece support base (14), and fall prevention means (16), juxtaposed to the respective crosslink mechanisms (13A, 13B), with the respective fall prevention means (16) including ratchet gears (37), fixed to movement path flanks of movable support shafts (22a, 22b), capable of horizontal movement, at the base (12) sides of the respective crosslink mechanisms (13A, 13B), and ratchet pawls (38), moving horizontally in interlock with the respective movable support shafts (22a, 22b) and being engaged with the ratchet gears (37) by urging forces to deter lowering of the workpiece support base (14). The lifter also includes actuators (39), which, when the workpiece support base (14) is lowered, switch and hold the respective ratchet pawls (38) against the urging forces to and in unengaged orientations of being separated from the ratchet gears (37). The lifter also includes a lowering process forcible fall prevention mechanism (46) which includes a pair of operating levers (47a, 47b) and a link mechanism (48 to 49b), where the pair of operating levers (47a, 47b) switch the respective ratchet pawls (38) in the unengaged orientations to engaged orientations of being engaged with the ratchet gears (37) against driving forces of the actuators (39). The link mechanism (48 to 49b) is such that, when a difference arises in movement amounts of the respective movable support shafts (22a, 22b) during lowering of the workpiece support base (14), it converts the movement amount difference to an operating force of the operating lever (47a/47b) at the larger movement amount side, and by the operating lever (47a/47b) at one side being driven by the link mechanism (48 to 49b), the operating lever (47a/47b) switches the ratchet pawl (38) at the larger movement amount side to the engaged orientation.

As described above, the configuration of the present invention is such that the movable support shafts at the base sides of the pair of crosslink mechanisms supporting the workpiece support base are not configured as respective end parts of a single common support shaft as described in Patent Literature 1 but are made vertically movable respectively and separately so that when the elevation/lowering drive chain juxtaposed to a crosslink mechanism at one side breaks during lowering of the workpiece support base (actually, it is premised that the two elevation/lowering drive chains will not break at the same time), a phenomenon occurs where the crosslink mechanism at the broken chain side is freed and collapses more rapidly than the crosslink mechanism at the opposite side due to gravitational force received from the workpiece support base side, and this phenomenon is captured to switch the ratchet pawl of the fall prevention means, juxtaposed to the crosslink mechanism at the broken chain side, to the engaged orientation forcibly and mechanically against the driving force of the actuator.

Therefore, with the configuration of the present invention, when an elevation/lowering drive chain at one side breaks when the workpiece support base, supported by the pair of crosslink mechanisms, is being lowered by the elevation/lowering drive chains, the collapsing of the crosslink mechanism at the broken chain side due to gravitational force can be restrained automatically by making the ratchet pawl be switched to the engaged orientation forcibly against the driving force of the actuator and be engaged with the ratchet gear. Consequently, a situation where, due to breakage of an elevation/lowering drive chain at one side, the workpiece support base is lowered while inclining greatly can be avoided to secure safety.

If the above-described movements occur, the other elevation/lowering drive chain that is not broken is continued to be driven in the workpiece support base lowering direction, the workpiece support base will consequently become inclined in a manner such that the other elevation/lowering drive chain side is lowered. However, a condition for the lowering of the workpiece support base is that the ratchet pawls are switched to the unengaged orientations and therefore a sensor that detects whether a ratchet pawl is in the engaged orientation or the unengaged orientation is essential for a drive control system of the elevation/lowering drive chains. Therefore, by utilizing the sensor as a means of detecting that a ratchet pawl at one side has been switched to the engaged orientation in the process of lowering the workpiece support base, a driving motor of both elevation/lowering drive chains can be emergency-stop locked based on a detection signal of the sensor in the process of lowering the workpiece support base to secure safety by performing emergency stop of the workpiece support base practically without letting it become inclined.

In implementing the present invention, each of the ratchet pawls (38) may have a sensor (40) juxtaposed thereto that detects that the ratchet pawl (38) has been switched to the engaged orientation against the driving force of the actuator (39) as described above and a driving motor (31) of the elevation/lowering drive chains (30a, 30b) may be configured to be stopped based on a sensor (40) at one side detecting that the corresponding ratchet pawl (38) has been switched to the engaged orientation during the lowering of the workpiece support base (14). Additionally, the respective ratchet pawls (38) and the operating levers (47a, 47b) operating the respective ratchet pawls (38) may be coupled to each other via springs (52a, 52b) may and be configured so that the respective operating levers (47a, 47b) pull and switch the operation target ratchet pawls (38) to the engaged orientations via the springs (52a, 52b). With the present configuration, even when a ratchet pawl is switched by the operating lever to the engaged orientation at a timing such that the ratchet pawl contacts a tooth tip of the ratchet gear, the operating force of the operating lever can be absorbed temporarily by deformation of the spring to thereafter make the ratchet pawl be securely engaged between teeth of the ratchet gear by an elastic restoration force of the spring. Also, although generally, a ratchet pawl can be urged in the engaged orientation direction only by the gravitational force acting on the ratchet pawl, an initial stress of the spring in a state where the operating lever is at an initial position may be configured to urge the ratchet pawl to the engaged orientation to make the ratchet pawl act reliably.

Also, the movable support shafts (22a, 22b) at the base (12) sides of the respective crosslink mechanisms (13A, 13B) may be borne on a pair of movable bases (21a, 21b) that are supported on the base (12) so as to be capable of moving horizontally respectively and separately. The operating levers (47a, 47b) may be pivotally supported on the respective movable bases (21a, 21b) so as to be capable of swinging horizontally. The link mechanism (48 to 49b) may be provided with a single main link (48) disposed so as to extend across both of the movable bases (21a, 21b) and having two locations in a length direction thereof pivotally supported by the respective movable bases (21a, 21b). Further, a configuration may be provided such that, when the main link (48) tilts horizontally due to the movement amount difference, a horizontal movement of an operation point (55a/55b) (which, among operation points (55a, 55b) set at two locations of the main link (48) that undergo motions in mutually opposite directions, is close to the movable base (21a/21b) at the larger movement amount side) causes the operating lever (47a/47b) on the movable base (21a/21b) to operate. With the present configuration, a configuration for applying an operating force to one specific operating lever among the two operating levers based on the movement amount difference of the two movable bases can be implemented easily.

Further, in a case of adopting the above configuration, the main link (48) may have its respective ends be the operation points (55a, 55b), and intermediate points further inward than the operation points (55a, 55b) at the respective ends may be pivotally supported on the respective movable bases (21a, 21b). The operating levers (47a, 47b) may, with respect to the movable support shafts (22a, 22b) on the respective movable bases (21a, 21b) and the ratchet pawls (38), be pivotally supported at sides of the respective movable bases (21a, 21b) in the direction of movement during the lowering of the workpiece support base (14). The operation points (55a, 55b) at the respective ends of the main link (48) may, with respect to the operating levers (47a, 47b), be disposed at sides at which the movable support shafts (22a, 22b) and the ratchet pawls (38) are provided. Transmission links (49a, 49b), each of which transmits a movement of the corresponding operation point (55a/55b) of the main link (48) to the corresponding operating lever (47a/47b) only when the operation point (55a/55b) of the main link (48) moves to approach the operating lever (47a/47b), may be interposed between intermediate parts of the operating levers (47a, 47b) and the operation points (55a, 55b) at the respective ends of the main link (48). And, free end parts of the operating levers (47a, 47b) may be coupled to the ratchet pawls (38). With the present configuration, movement amounts of the operating levers with respect to an inclination angle of the main link can readily be made large even in the latter half of the workpiece support base lowering process in which horizontal movement amounts of the movable support shafts (movable bases) with respect to unit lowering amount of the workpiece support base become small. Also, even when an elevation/lowering drive chain breaks in the latter half of the workpiece support base lowering process, the operating lever can be made to move by just the necessary angle to reliably switch the ratchet pawl to the engaged orientation.

BRIEF DESCRIPTION OF THE DRAWINGS

FIG. 7A is an enlarged side view of essential parts when the workpiece support base is at the lowering limit height and FIG. 7B is an enlarged side view of essential parts when the workpiece support base is elevated from the lowering limit height.

FIG. 8A is an enlarged side view of essential parts indicating the working support base by solid lines when it is started to be lowered from the elevation limit height and by virtual lines when it is in the middle of being lowered, and FIG. 8B is an enlarged side view of essential parts showing conditions when an elevation/lowering drive chain breaks in the middle of lowering of the workpiece support base.

DETAILED DESCRIPTION OF THE INVENTION

Figure 1:
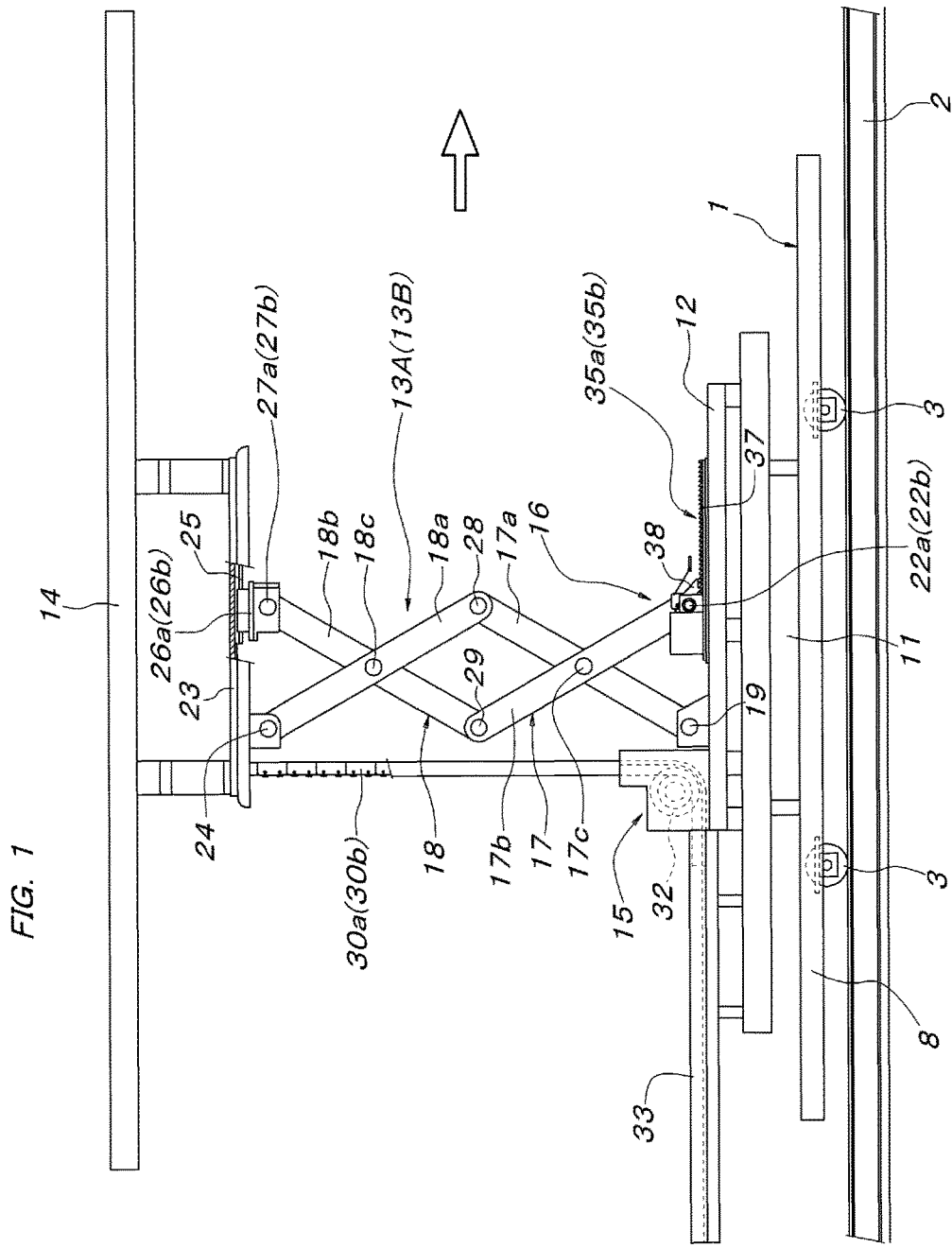
FIG. 1 is a side view of a state in which a workpiece support base is at an elevation limit height.

In FIG. 1 to FIG. 4, a conveying traveling body 1 includes two front and rear pairs of right and left wheels 3 rolling on a pair of right and left supporting guide rails 2 laid along a travel path of the conveying traveling body 1. A pair of front and rear steady rollers 5 fitting in right-left lateral direction steady guide rails 4 are laid at an outer side of, and so as to be in parallel to, a guide rail 2 at one side, and a pair of front and rear vertical motion preventing rollers 7 fitting in a vertical motion preventing guide rail 6 are laid at an inner side of, and so as to be in parallel to, the guide rail 2 at one side. The conveying traveling body 1 is thereby configured to be capable of traveling along the fixed travel path. A travel drive means of the conveying traveling body 1 may be of any configuration. For example, friction drive means 10 may be used as indicated by virtual lines in FIG. 4. The friction drive means 10 can include friction drive wheels 9, which are put in pressure contact with respective right and left rectilinear side surfaces 8 parallel to a travel direction of the conveying traveling body 1 and sandwich the conveying traveling body 1 from the respective right and left directions, and motors driving the friction drive wheels 9 to rotate 4.

A base 12 is installed via an intermediate frame 11 on the conveying traveling body 1 described above and on this base 12, a workpiece support base 14 is supported in a manner enabling parallel vertical movement via a pair of right and left crosslink mechanisms 13A and 13B and juxtaposed thereto are an elevation/lowering drive means 15 and fall prevention means 16 of the workpiece support base 14. The crosslink mechanisms 13A and 13B are of laterally symmetric structures and each includes two upper and lower stages of crosslinks 18 and 17 that are coupled to each other, with lower ends of inner links 17a of the lower stage crosslinks 17 being borne by right-left horizontally oriented position-fixed support shafts 19 supported at respective right and left sides of a rear end side on the base 12. Movable bases 21a and 21b, supported on slide rails 20 so as to be capable of moving horizontally forward and in reverse, are provided at respective right and left sides of a front half part on the base 12, and lower ends of outer links 17b of the lower stage crosslinks 17 are borne by movable support shafts 22a and 22b that are supported in right-left horizontally oriented manner on the movable bases 21a and 21b. Also, upper ends of outer links 18a of the upper stage crosslinks 18 are borne by right-left horizontally oriented position-fixed support shafts 24 supported directly above the position-fixed support shafts 19 at respective right and left sides of a rear end side of a frame 23 supporting the workpiece support base 14. Movable bases 26a and 26b, supported on slide rails 25 so as to be capable of moving horizontally forward and in reverse, are provided at respective right and left sides of a front half part of the frame 23, and upper ends of inner links 18b of the upper stage crosslinks 18 are borne by movable support shafts 27a and 27b that are supported in right-left horizontally oriented manner on the movable bases 26a and 26b. Intermediate fulcrum shafts 18c and 17c of the respective upper and lower crosslinks 18 and 17, and coupling support shafts 28 and 29 couple the respective upper and lower crosslinks 18 and 17 to each other.

By the configuration of the crosslink mechanisms 13A and 13B described above, the workpiece support base 14 is supported so as to be capable of vertically ascending and lowering movements while maintaining a horizontal orientation with respect to the base 12 at the conveying traveling body 1 side and while accompanying horizontal forward/reverse movements of the pair of right and left movable support shafts 22a and 22b at the base 12 side, and horizontal forward/reverse movements of the pair of right and left movable support shafts 27 at the workpiece support base 14 side. The elevation/lowering drive means 15 that performs elevation/lowering drive of the workpiece support base 14 is configured from a pair of right and left elevation/lowering drive chains 30a and 30b, juxtaposed to the respective crosslink mechanisms 13A and 13B, and a speed reducer equipped motor 31 that drives both elevation/lowering drive chains 30a and 30b synchronously. The pair of right and left elevation/lowering drive chains 30a and 30b have upper ends thereof coupled and fixed, at rear sides of the respective crosslink mechanisms 13A and 13B, to a lower side of the frame 23 at the workpiece support base 14 side. The pair of right and left elevation/lowering drive chains 30a and 30b also have intermediate parts engaged with driving sprocket wheels 32 pivotally supported, at rear sides of the respective crosslink mechanisms 13A and 13B, on the base 12 at the conveying traveling body 1 side, and have parts extending horizontally rearward from the driving sprocket wheels 32 housed inside housing casings 33 of rectangular cylindrical shapes that are long in a front-rear horizontal direction and are supported on the intermediate frame 11 at the conveying traveling body 1 side.

Each of the elevation/lowering drive chains 30a and 30b is bendable to just one side from a rectilinear state, the driving sprocket wheel 32 is engaged with the bendable side, and a region from the driving sprocket wheel 32 to the frame 23 at the workpiece support base 14 side is configured to have a vertical rod shape to support the workpiece support base 14. The pair of mutually concentric right and left driving sprocket wheels 32 engaged with the respective elevation/lowering drive chains 30a and 30b are interlockingly coupled, via a pair of right and left transmission shafts 34a and 34b, to mutually concentric drive shafts (projecting to respective right and left sides) of the speed reducer equipped motor 31 installed on the base 12 at a position intermediate the pair of right and left crosslink mechanisms 13A and 13B. Thus, the right and left driving sprocket wheels 32 are synchronously driven at the same speed and in the same direction by the speed reducer equipped motor 31.

Therefore, by driving the pair of right and left driving sprocket wheels 32 by the speed reducer equipped motor 31 to rotate in a direction of feeding out the respective elevation/lowering drive chains 30a and 30b upward from the driving sprocket wheels 32, the elevation/lowering drive chains 30a and 30b are pulled out from inside the housing casings 33 and fed out upward from the driving sprocket wheels 32 to become vertical rod shaped bodies that push up and elevatingly move the workpiece support base 14 via the frame 23. Oppositely, by driving the pair of right and left driving sprocket wheels 32 by the speed reducer equipped motor 31 to rotate in reverse, the respective elevation/ lowering drive chains 30a and 30b of vertical rod shape supporting the workpiece support base 14 via the frame 23 are pulled down and lowered to the driving sprocket wheel 32 sides and the supported workpiece support base 14 is thereby loweringly moved. The elevation/lowering drive chains 30a and 30b that are fed out rearward from the driving sprocket wheels 32 are inserted inside the housing casings 33.

The fall prevention means 16 includes ratchet mechanisms 35a and 35b installed in parallel to outer sides of forward/reverse movement regions of the movable bases 21a and 21b at lower end sides of the respective crosslink mechanisms 13A and 13B, and includes a lowering process forcible fall prevention mechanism 46. To describe details of the ratchet mechanisms 35a and 35b based on FIG. 5 to FIG. 7B, the respective ratchet mechanisms 35a and 35b are of mutually laterally symmetric structures and each is configured from a band base plate 36, laid on the base 12 in parallel to the slide rails 20, and a ratchet gear 37 laid, in parallel to the slide rails 20, on the band base plate 36. The ratchet mechanism also includes a ratchet pawl 38 supported at an outer end part side of the movable support shaft 22a or 22b so as to be rotatable around the corresponding movable support shaft 22a or 22b, an actuator (solenoid) 39 for releasing the ratchet pawl, and a ratchet pawl movement detecting sensor 40.

Each of the movable support shafts 22a and 22b has, on an outer end projecting further outward than the corresponding ratchet pawl 38, a bearing member 41 supported so as to be rotatable around the corresponding movable support shaft 22a or 22b. The corresponding actuator 39 is mounted on an inner side of a vertical side plate 42 connected to the bearing member 41 so as to extend rearward therefrom. An outer end part of a retraction shaft 39a of the actuator 39 is fitted in a bifurcated projecting part 38a of the ratchet pawl 38 projecting at an upper side of the corresponding movable support shaft 22a or 22b. The retraction shaft 39a of the actuator 39 and the ratchet pawl 38 are coupled by a large-diameter hole 43 provided at the corresponding bifurcated projecting part 38a and a pin 44 mounted to an outer end part of the retraction shaft 39a of the actuator 39 so as to fit loosely inside the large-diameter hole 43. Also, the corresponding sensor 40 is mounted via a bracket 45 to the bearing member 41 and a detection end (light emitting/receiving opening) thereof is constituted of a reflection type photoelectric switch that contactlessly detects a side surface of the ratchet pawl 38. The bearing member 41 and the vertical side plate 42 can, in a state where lower side faces slidingly contact the band base plate 36 due to a gravitational force acting on these components and the actuator 39, move integrally with the corresponding movable support shaft 22a or 22b in the front-rear horizontal direction.

Each ratchet pawl 38 receives, due to a gravitational force acting on the ratchet pawl 38, an urging force of rotation around the corresponding movable support shaft 22a or 22b in a direction in which a pawl part at a distal end drops to the corresponding ratchet gear 37 side, and by the urging force, the ratchet pawl 38 is put in an engaged orientation in which the pawl part at the distal end fits between teeth of the ratchet gear 37 as shown in FIG. 7A. When the ratchet pawl 38 passes over a tooth of the ratchet gear 37, the ratchet pawl 38 moves upward around the corresponding movable support shaft 22a or 22b against the urging force and enters a passing orientation as shown in FIG. 7B; however, this vertical swinging of the ratchet pawl 38 around the corresponding movable support shaft 22a or 22b is performed within a free movement range of the large-diameter hole 43 at the ratchet pawl 38 side with respect to the pin 44 at the outer end of the retraction shaft 39a of the actuator 39 and thus a load does not act on the retraction shaft 39a of the actuator 39. Also, the vertical swinging of the ratchet pawl 38 between the engaged orientation and the passing orientation is performed within a range in which the side surface of the ratchet pawl 38 does not enter a detection region of the sensor 40 and therefore the sensor 40 is in an OFF state. By energizing the actuator 39 to make its retraction shaft 39a retract and make the pin 44 of the retraction shaft 39a pull the ratchet pawl 38 up around the corresponding movable support shaft 22a or 22b against the urging force as shown in FIG. 8A, the ratchet pawl 38 is switched to the unengaged orientation of being released from the ratchet gear 37 and in this process, the side surface of the ratchet pawl 38 enters the detection region of the sensor 40 and the sensor 40 is switched to the ON state.

As shown in FIG. 3 to FIG. 7B, the lowering process forcible fall prevention mechanism 46 includes operating levers 47a and 47b, which forcibly operate the respective ratchet pawls 38 in the pair of right and left ratchet mechanisms 35a and 35b, and includes, for alternative operation of the respective operating levers 47a and 47b, a main link 48, disposed across the movable bases 21a and 21b supporting the movable support shafts 22a and 22b at the base 12 sides of the respective crosslink mechanisms 13A and 13B, and transmission links 49a and 49b, interlocking respective end parts of the main link 48 with the operating levers 47a and 47b at the same sides. The respective operating levers 47a and 47b are disposed in right-left lateral orientations at front sides of the movable support shafts 22a and 22b and the ratchet pawls 38. Inner end parts of the operating levers 47a and 47b are right-left laterally oriented and are pivotally supported in horizontally swingable manner by vertical support shafts 51a and 51b on support plates 50a and 50b attached to front side faces of the respective movable bases 21a and 21b, and outer end parts thereof and front end parts of the bifurcated projecting parts 38a of the respective ratchet pawls 38 positioned rearward thereof being coupled via front-rear longitudinally oriented extension coil springs 52a and 52b.

Figure 5:
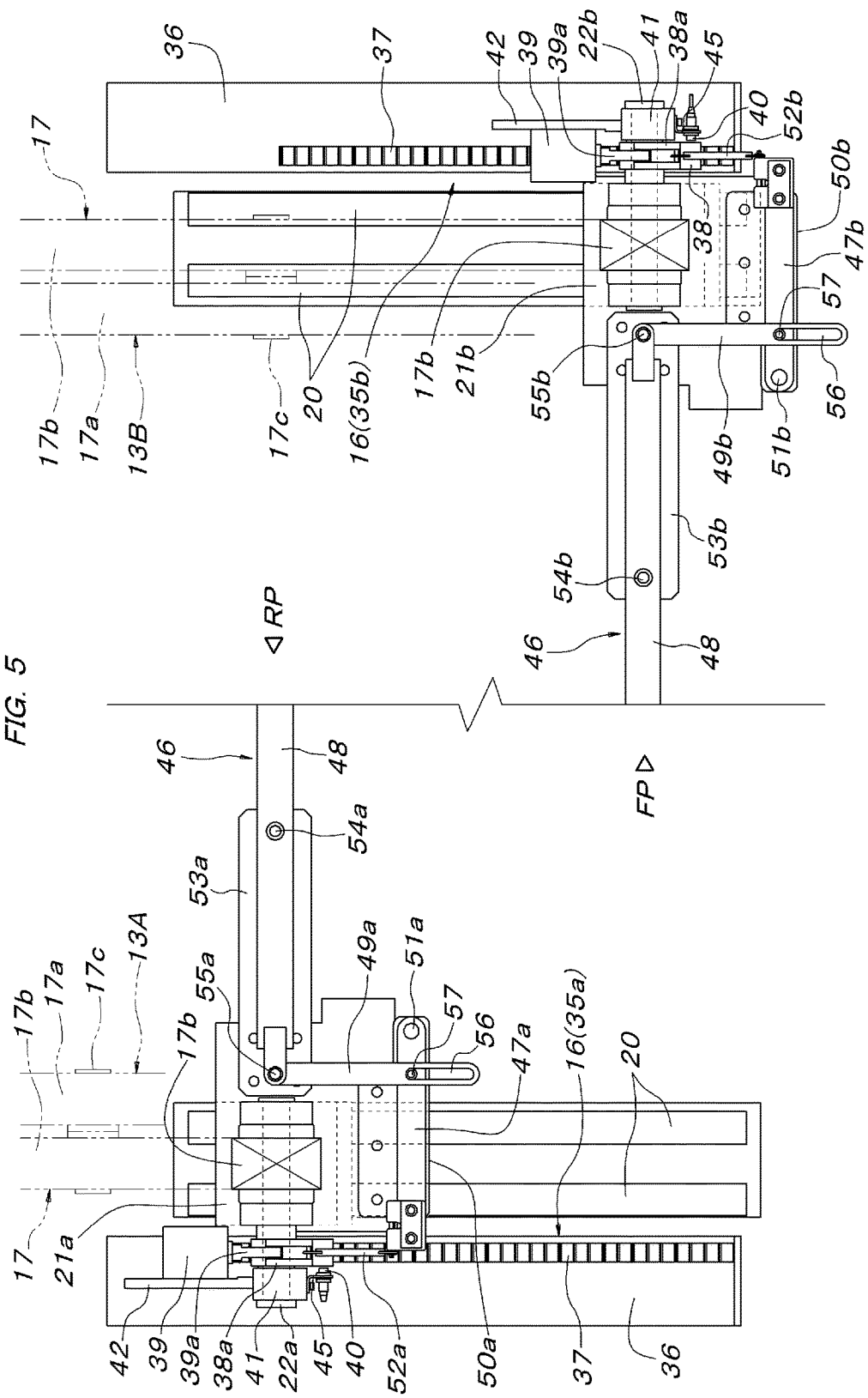
FIG. 5 is an enlarged plan view of essential parts showing the state in which the workpiece support base is at the elevation limit height at a left half part and showing the state in which the workpiece support base is at the lowering limit height at a right half part.
Figure 6:
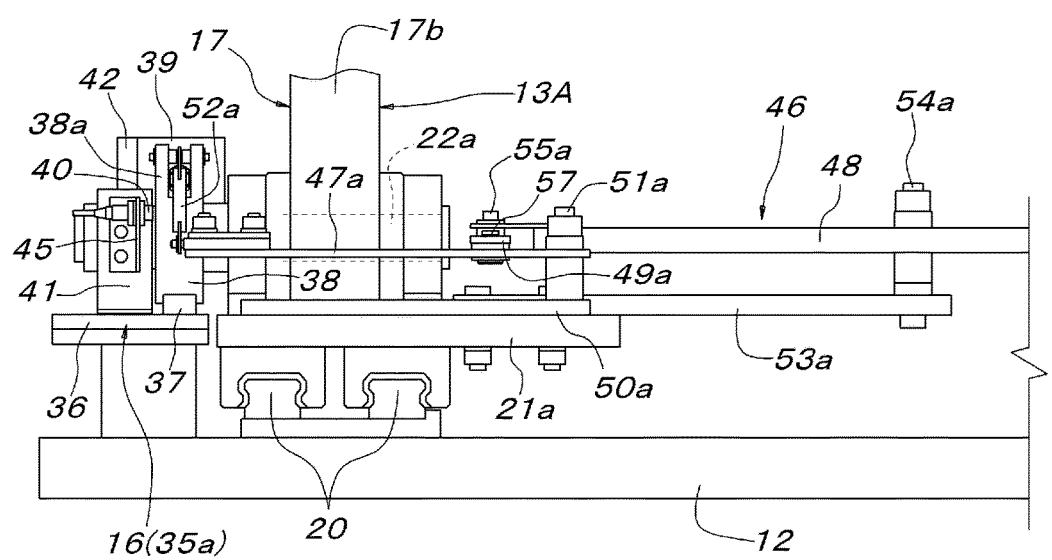
FIG. 6 is an enlarged front view of essential parts.

The respective movable bases 21a and 21b are provided with support plates 53a and 53b that are mounted at inner sides of the positions of the movable support shafts 22a and 22b and extend inward cantileveredly. Two intermediate locations of the main link 48 inwardly separated from respective ends thereof are pivotally supported in horizontally swingable manner by vertical support shafts 54a and 54b, respectively, on inner end parts of the support plates 53a and 53b. Also, rear end parts of the front-rear longitudinally oriented transmission links 49a and 49b are pivotally supported in horizontally swingable manner by vertical support shafts at operation points 55a and 55b at respective ends of the main link 48 outwardly separated from the vertical support shafts 54a and 54b. The respective transmission links 49a and 49b are provided, at front end parts thereof, with slots 56 extending along front-rear length directions thereof, and vertical pins 57, fitting in the slots 56, are upwardly protruded at length direction intermediate positions of the respective right-left laterally oriented operating levers 47a and 47b close to the vertical support shafts 51. During normal operation, the pair of right and left crosslink mechanisms 13A and 13B undergo rising and collapsing motions in synchronization, and the pair of right and left movable bases 21a and 21b bearing the movable support shafts 22a and 22b at the base 12 side move forward and in reverse in synchronization so as to constantly maintain a state where the two movable support shafts 22a and 22b are concentric. In this state, the main link 48 and the respective operating levers 47a and 47b are in right-left lateral orientations orthogonal to the forward/reverse movement direction of the respective movable bases 21a and 21b and the respective transmission links 49a and 49b are in front-rear longitudinal orientations parallel to the forward/reverse movement direction of the respective movable bases 21a and 21b as shown in FIG. 5. In this state, the vertical pins 57 at the respective operating lever 47a and 47b sides are at front ends (ends close to the operation points 55a and 55b at respective ends of the main link 48) of the slots 56 of the respective transmission links 49a and 49b.

Although each extension coil spring 52 is configured so that a load is hardly applied thereto when the corresponding ratchet pawl 38 swings vertically between the engaged orientation shown in FIG. 7A and the passing orientation shown in FIG. 7B, the extension coil spring 52 may be configured so as to be tensioned slightly when the ratchet pawl 38 moves upward from the engaged orientation to the passing orientation so that the ratchet pawl 38 is configured to be kept in the engaged orientation not just by gravitational force but by a tensile force of the corresponding extension coil spring 52a or 52b as well.

Figure 2:
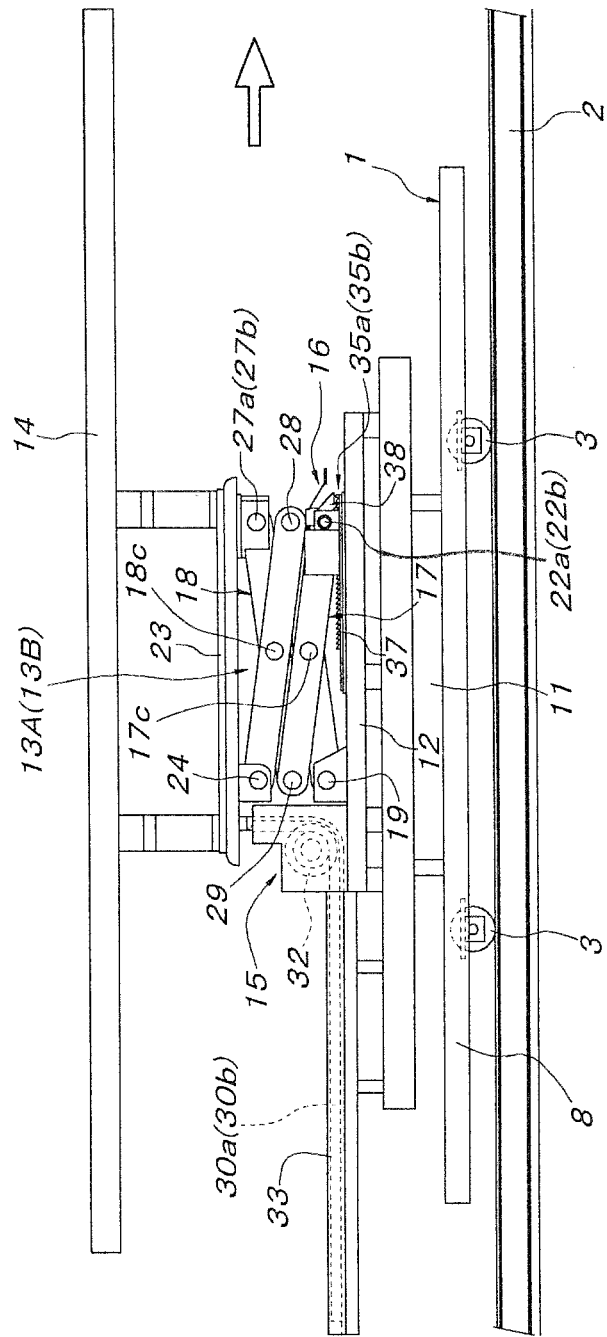
FIG. 2 is a side view of a state in which the workpiece support base is at a lowering limit height.
Figure 3:
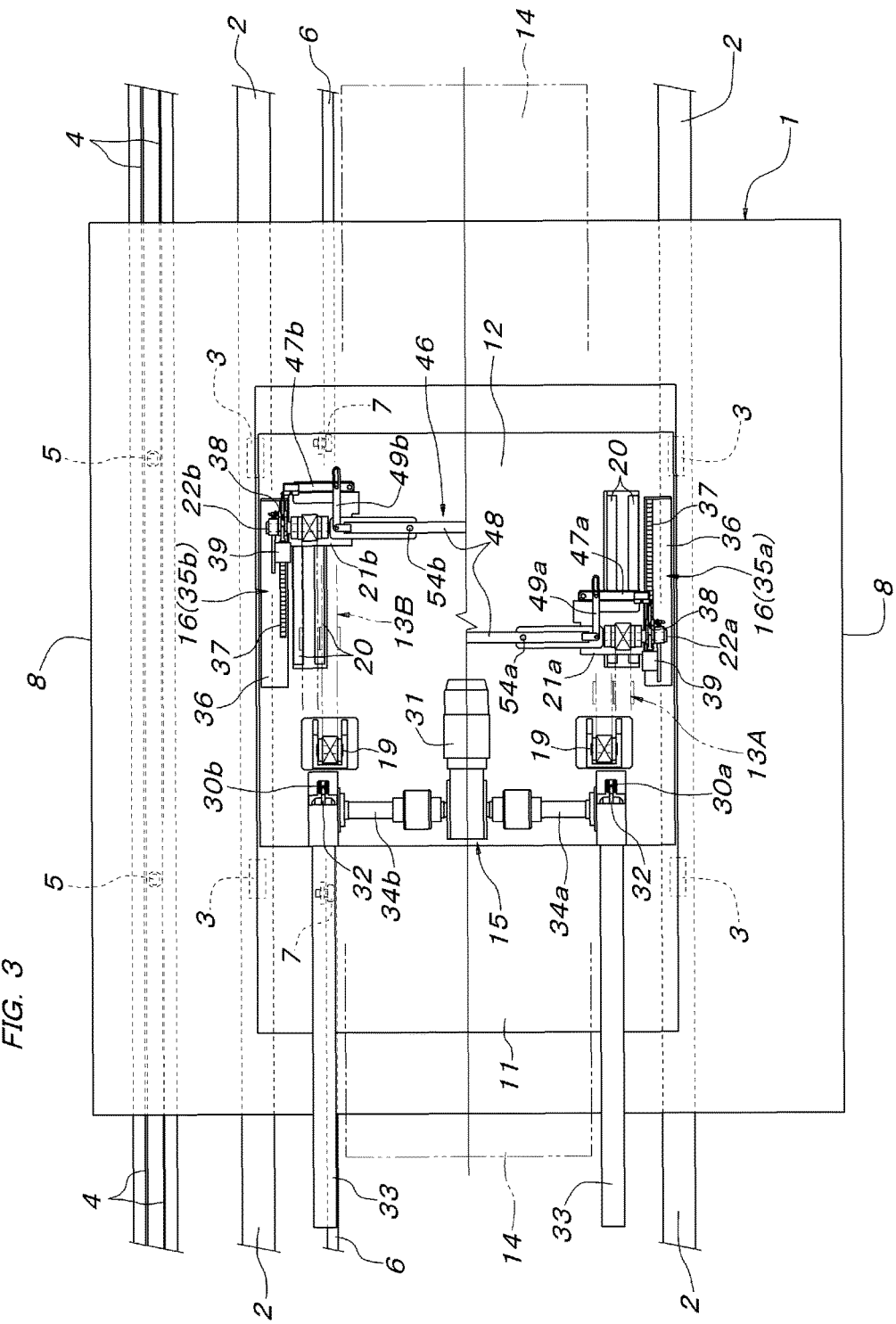
FIG. 3 is a transverse sectional plan view showing the state in which the workpiece support base is at the lowering limit height at an upper half part and showing the state in which the workpiece support base is at the elevation limit height at a lower half part.
Figure 4:
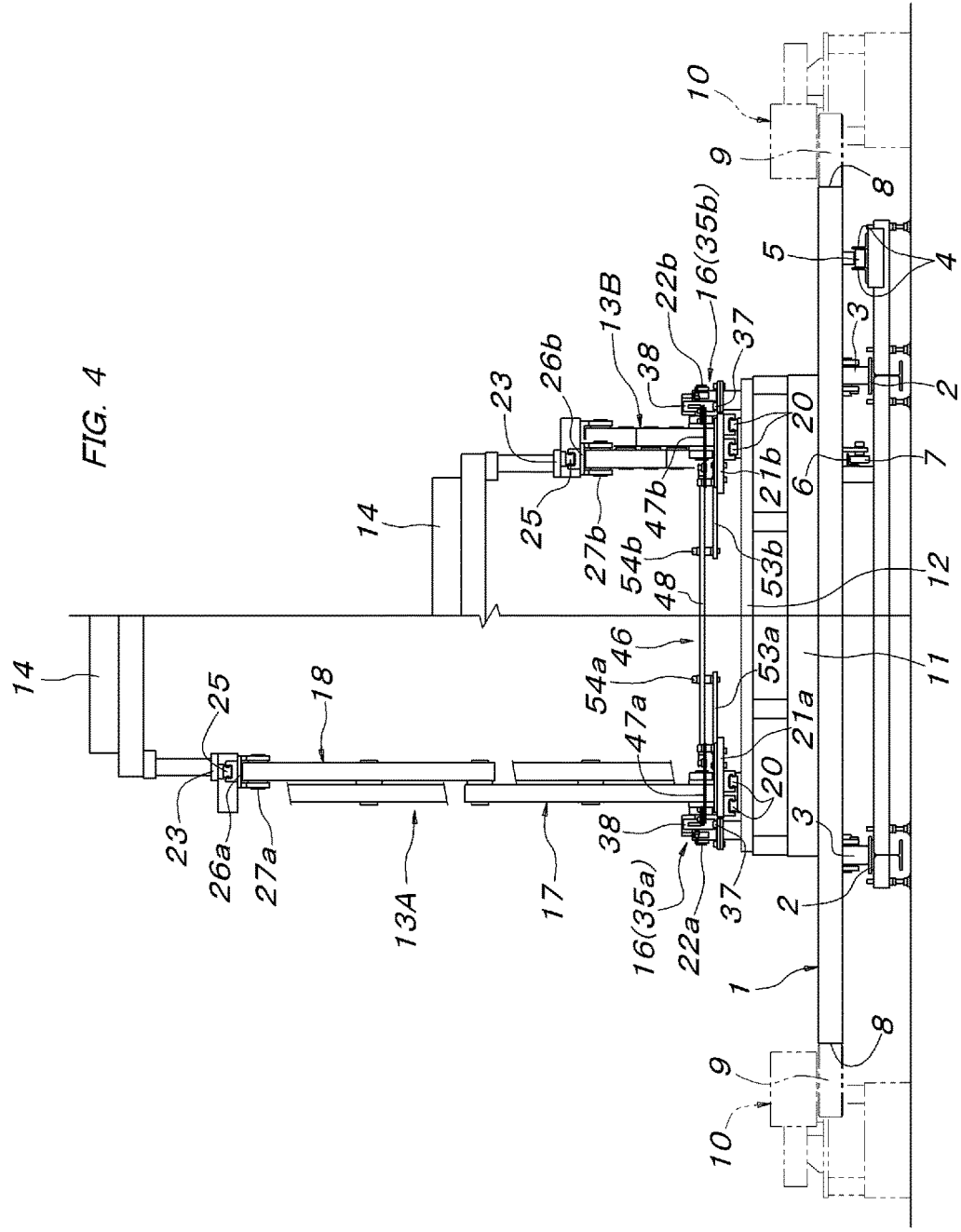
FIG. 4 is a front view showing the state in which the workpiece support base is at the elevation limit height at a left half part and showing the state in which the workpiece support base is at the lowering limit height at a right half part.

With the configuration described above, when the workpiece support base 14 is at a lowering limit height shown in FIG. 2, the pair of right and left movable support shafts 22a and 22b at the base 12 sides of the respective crosslink mechanisms 13A and 13B are at forward movement limit positions FP corresponding to front ends within front-rear horizontal direction movement ranges thereof as shown in FIG. 5 and FIG. 7A, and when, from this state, the workpiece support base 14 is to be elevated within a range up to an elevation limit height shown in FIG. 1, the speed reducer equipped motor 31 of the elevation/lowering drive means 15 is put in operation to push up and elevatingly move the workpiece support base 14 by the elevation/lowering drive chains 30a and 30b as described above. In this process, the movable support shafts 22a and 22b at the base 12 sides of the respective crosslink mechanisms 13A and 13B move rearward from the forward movement limit positions FP in accordance with the changing of the respective crosslink mechanisms 13A and 13B from the collapsed orientations to the raised orientations, and during this process, the respective ratchet pawls 38 of the ratchet mechanisms 35a and 35b swing vertically around the movable support shafts 22a and 22b between the engaged orientations as shown in FIG. 7A and the passing orientations as shown in FIG. 7B. When the workpiece support base 14 is being pushed up and elevatingly moved normally by the elevation/lowering drive chains 30a and 30b, the pair of right and left crosslink mechanisms 13A and 13B change from the collapsed orientations to the raised orientations in mutual synchronization and therefore the movable support shafts 22a and 22b at the base 12 sides of the respective crosslink mechanisms 13A and 13B move synchronously rearward while maintaining the mutually concentric state.

When upon the workpiece support base 14 reaching a prescribed height (for example, the elevation limit height shown in FIG. 1), the speed reducer equipped motor 31 of the elevation/lowering drive means 15 is stopped to stop the push-up drive by the elevation/lowering drive chains 30a and 30b. At that point or after a slight time delay, the respective ratchet pawls 38 in the ratchet mechanisms 35a and 35b of the fall prevention means 16 enter the engaged orientations as shown in FIG. 7A to deter forward movements of the movable support shafts 22a and 22b, that is, collapsing motions of the crosslink mechanisms 13A and 13B and the workpiece support base 14 is thus stably maintained at the prescribed height. Even if, during the middle of elevatingly moving the workpiece support base 14, an accident occurs such that either of the elevation/lowering drive chains 30a and 30b supporting the workpiece support base 14 breaks, a falling accident of the workpiece support base 14 can be prevented reliably because the lowering of the workpiece support base 14 accompanies the collapsing motions of the crosslink mechanisms 13A and 13B, that is, the forward movements of the movable support shafts 22a and 22b and the forward movements of the movable support shafts 22a and 22b are instantly deterred by the engagements of the respective ratchet pawls 38 of the ratchet mechanisms 35a and 35b with the ratchet gears 37.

Obviously, breakage of both elevation/lowering drive chains 30a and 30b at the same time does not occur in actuality and therefore the elevation/lowering drive chain 30a or 30b at the unbroken side will receive the driving force from the speed reducer equipped motor 31 and continue to push up the workpiece support base 14 so that the workpiece support base 14 will become tilted. To avoid such an unfavorable situation, it is preferable, for example, to utilize a sensor detecting that relative movement in the front/rear direction has occurred in the movable support shafts 22a and 22b (movable bases 21a and 21b) at the base 12 sides of the respective crosslink mechanisms 13A and 13B, etc., to quickly detect the abnormal situation described above and take countermeasures such as emergency stop of the speed reducer equipped motor 31, abnormality occurrence notification, etc., based on the detection.

When the workpiece support base 14 is stopped upon being pushed up to the elevation limit height shown in FIG. 1, the movable support shafts 22a and 22b at the base 12 sides of the respective crosslink mechanisms 13A and 13B are at reverse movement limit positions RP as shown in FIG. 5 and FIG. 8B. When the workpiece support base 14 at the elevation limit height is to be lowered or the workpiece support base 14 that is stopped upon being pushed up to any height lower than the elevation limit height is to be lowered, the respective actuators 39 in the ratchet mechanisms 35a and 35b of the fall prevention means 16 are energized to switch the ratchet pawls 38 to the unengaged orientations of being released from the ratchet gears 37 as shown in FIG. 8A and, at the same time, the speed reducer equipped motor 31 of the elevation/lowering drive means 15 is driven to rotate in reverse and thus driven to pull down the elevation/lowering drive chains 30a and 30b. In actuality, it is not easy to switch the ratchet pawls 38, which are strongly engaged with the ratchet gears 37 by the gravitational force received from the workpiece support base 14 side, to the unengaged orientations by the driving forces of the actuators 39, and therefore at first, the speed reducer equipped motor 31 of the elevation/lowering drive means 15 may be driven to rotate forward for just a short fixed time so as to slightly push up the workpiece support base 14 by means of the elevation/lowering drive chains 30a and 30b and thereby enter a state where forces of engagement of the ratchet pawls 38 with the respective ratchet gears 37 of the ratchet mechanisms 35a and 35b are eliminated, and the actuators 39 may be started in this state to switch the ratchet pawls 38 to the unengaged orientations and the elevation/lowering drive chains 30a and 30b may thereafter be driven so as to be pulled down.

By using, as the speed reducer equipped motor 31 of the elevation/lowering drive means 15, a motor equipped with a speed reducer with a structure such that a motor shaft side cannot be rotated from the transmission shaft 34*a* and 34*b* sides (output shaft side) (for example, a speed reducer that utilizes a worm gear), the workpiece support base 14 can be lowered stably at a prescribed speed in accordance with the lowering of the elevation/lowering drive chains 30*a* and 30*b* that are driven in the pulling-down direction by the speed reducer equipped motor 31. When the workpiece support base 14 is thus being loweringly moved at a normal speed by the pulling-down drive of the elevation/lowering drive chains 30*a* and 30*b*, the pair of right and left crosslink mechanisms 13A and 13B change from the raised orientations to the collapsed orientations in mutual synchronization and therefore the movable support shafts 22*a* and 22*b* at the base 12 sides of the respective crosslink mechanisms 13A and 13B move synchronously forward while maintaining the mutually concentric state. If in the middle of the lowering, either of the elevation/lowering drive chains 30*a* and 30*b* breaks, a side face at the side supported by the broken elevation/lowering drive chain 30*a* or 30*b* will tend to descend forcefully due to gravitational force; however, the respective ratchet pawls 38 in the ratchet mechanisms 35*a* and 35*b* of the fall prevention means 16 are switched to the unengaged orientations as shown in FIG. 8A and lack the fall prevention function.

Figure 9:
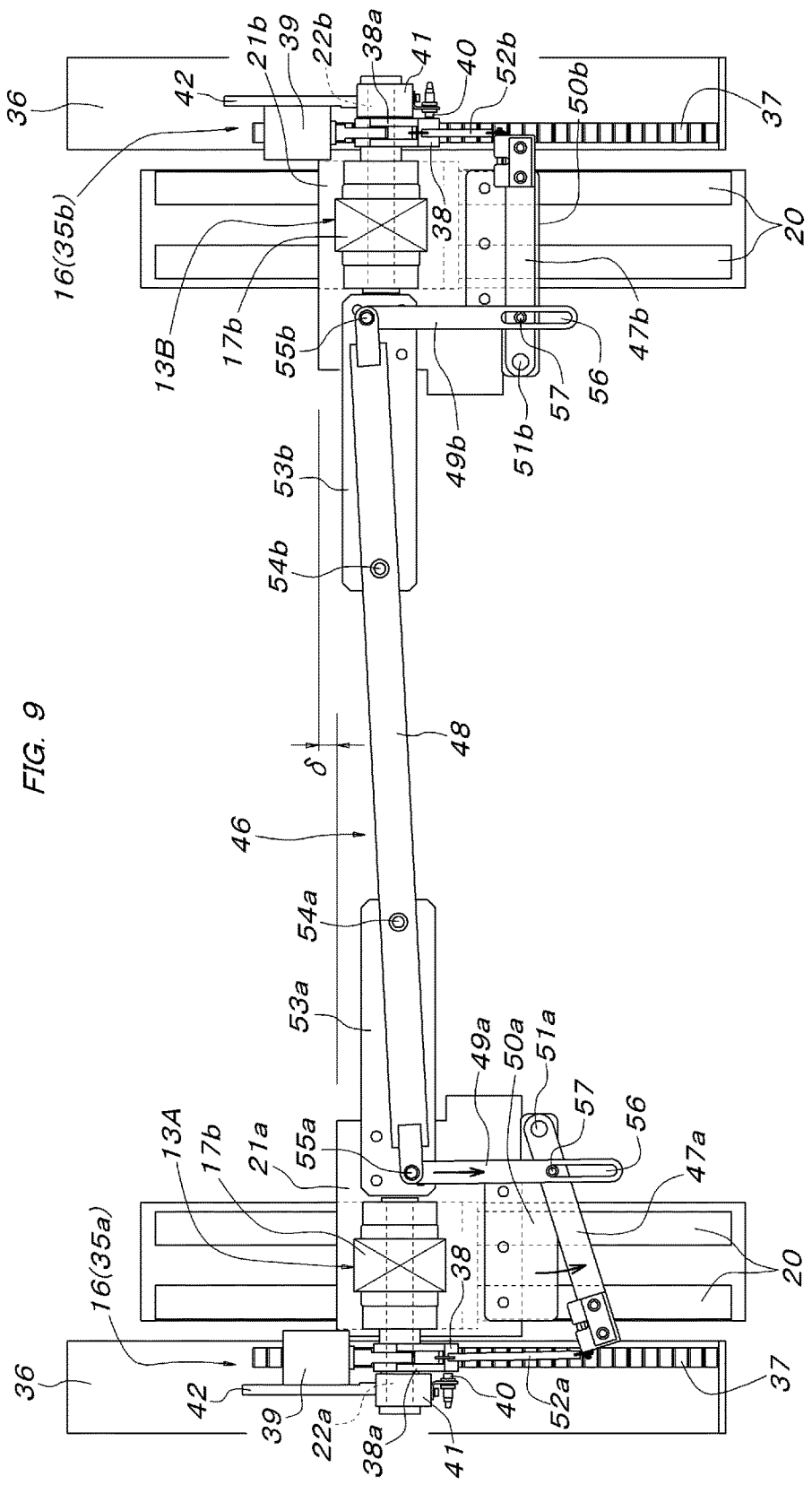
FIG. 9 is an enlarged plan view of essential parts showing the conditions when the elevation/lowering drive chain breaks in the middle of lowering of the workpiece support base.

When such a situation occurs, the lowering process forcible fall prevention mechanism 46 functions. For example, if, among the elevation/lowering drive chains 30*a* and 30*b*, the elevation/lowering drive chain 30*a* at the crosslink mechanism 13A side breaks, the crosslink mechanism 13A receives the gravitational force at the workpiece support base 14 side and will tend to change to the collapsed orientation faster than the crosslink mechanism 13B at the opposite side so that, as shown in FIG. 9, the movable base 21*a* (movable support shaft 22*a*) at the crosslink mechanism 13A side moves forward at a higher speed than the movable base 21*b* (movable support shaft 22*b*) at the opposite crosslink mechanism 13B side. Consequently, a movement amount difference δ, shown in FIG. 9, arises between the two movable bases 21*a* and 21*b*. The main link 48, with which two intermediate locations are pivotally supported on the respective movable bases 21*a* and 21*b* by the vertical support shafts 54*a* and 54*b*, will thus tilt horizontally such that the side of the movable base 21*a* of larger movement amount is further advanced than the side of the movable base 21*b* of smaller movement amount. In this state, the vertical support shafts 54*a* and 54*b* (that pivotally support the two intermediate locations of the main link 48 on the respective movable bases 21*a* and 21*b*) undergo rectilinear motions in the front/rear direction. Therefore, one shaft hole at the main link 48 side in which either vertical support shaft 54*a* or 54*b* at one side fits is in the form of a slot of right-left lateral orientation or the two shaft holes at the main link 48 side, in which the vertical support shafts 54*a* and 54*b* fit, are made slightly large to provide a tolerance, or "play".

When the main link 48 tilts horizontally as described above, the operation point 55*a* at the movable base 21*a* side of the main link 48 moves forward greatly from an initial position to push out the transmission link 49*a* forward and cause, via a rear end of the slot 56 and the vertical pin 57, the operating lever 47*a* to horizontally swing forward around the vertical support shaft 54*a* as shown in FIG. 9. Consequently, as shown in FIG. 8B, the operating lever 47*a* pulls in the ratchet pawl 38 of the ratchet mechanism 35*a* at the crosslink mechanism 13A side forward and downward around the movable support shaft 22*a* via the extension coil spring 52 so that the ratchet pawl 38 is forcibly switched to the engaged orientation against the driving force of the actuator 39 and engaged between teeth of the ratchet gear 37. If this occurs at a timing at which the pawl part at the distal end of the ratchet pawl 38 contacts a distal end of a tooth of the ratchet gear 37, the extension coil spring 52*a* elongates temporarily to absorb an operating force of the operating lever 47*a* and causes the ratchet pawl 38 to be switched to the engaged orientation at the next timing corresponding to the pawl part at the distal end of the ratchet pawl 38 being between teeth of the ratchet gear 37. By this series of movements, the fall prevention function by the ratchet pawl 38 and the ratchet gear 37 acts at the ratchet mechanism 35*a* at the broken elevation/lowering drive chain 30*a* side and at that point, the collapsing motion of the crosslink mechanism 13A at the broken elevation/lowering drive chain 30*a* side is deterred.

When oppositely to the above example, the elevation/lowering drive chain 30*b* at the opposite side breaks, the main link 48 tilts horizontally in the opposite direction so that the fall prevention function by the ratchet pawl 38 and the ratchet gear 37 acts at the ratchet mechanism 35*b* at the broken elevation/lowering drive chain 30*b* side and at that point, the collapsing motion of the crosslink mechanism 13B at the broken elevation/lowering drive chain 30*b* side is deterred.

Although the other operation point 55*b* (or operation point 55*a*) of the main link 48 that tilts horizontally as described above moves slightly rearward from an initial position to pull in the transmission link 49*b* (or transmission link 49*a*) rearward as shown in FIG. 9, the movements in this process are such that just the slot 56 of the corresponding transmission link 49*b* or 49*a* moves freely rearward with respect to the vertical pin 57 of the operating lever 47*b* or 47*a* and an operating force does not act on the operating lever 47*b* or 47*a*. Although the collapsing motion of the crosslink mechanism 13B or 13A at the unbroken elevation/lowering drive chain 30*b* or 30*a* side is thus continued in accordance with the downward pulling-in drive of the corresponding elevation/lowering drive chain 30*b* or 30*a*, this circumstance consequently leads to tilting of the workpiece support base 14 and is thus unfavorable. Therefore, as described above, it is preferable to utilize a sensor detecting that relative movement in the front/rear direction has occurred in the movable support shafts 22*a* and 22*b* (movable bases 21*a* and 21*b*) at the base 12 sides of the respective crosslink mechanisms 13A and 13B, etc., to quickly detect the abnormal situation described above and take countermeasures such as emergency stop of the speed reducer equipped motor 31, switching of the actuator 39 from ON to OFF (interruption of energization) in case of lowering operation of the workpiece support base 14, and abnormality occurrence notification, etc., based on the detection.

The ratchet pawl movement detecting sensor 40 can detect that the ratchet pawl 38 of the ratchet mechanism 35*a* or 35*b* at the broken elevation/lowering drive chain 30*a* or 30*b* side has been forcibly switched from the unengaged orientation to the engaged orientation by the operating lever 47*a* or 47*b* through the action of the lowering process forcible fall prevention mechanism 46 described above. This can be detected by an ON to OFF operation of the ratchet pawl movement detecting sensor 40 at the corresponding ratchet mechanism 35*a* or 35*b* side. The countermeasures, such as emergency stop of the speed reducer equipped motor 31, switching of the actuator 39 from ON to OFF (interruption of energization) in case of lowering operation of the workpiece support base 14, and abnormality occurrence notification, etc., can thus be executed in interlock with this sensor operation.

Although a most preferred embodiment of the present invention has been described together with the drawings, the present invention is not restricted to the specific configuration of this embodiment. For example, the main link 48 may have its respective ends be pivotally supported at the respective movable base 21a and 21b sides by the vertical support shafts 54a and 54b and may have two intermediate locations further inward than the respective ends as the operation points 55a and 55b. In this case, the directions of motions of the operation points 55a and 55b are reversed with respect to those of the embodiment described above and it may thus be considered to dispose the operating levers 47a and 47b and the transmission links 49a and 49b at rear sides of the main link 48 so that the ratchet pawls 38 of the respective ratchet mechanisms 35a and 35b can be pushed forward from the rear side by the operating levers 47a and 47b to be forcibly switched to the engaged orientations. It is further possible to eliminate the transmission links 49a and 49b, connect the operating levers 47a and 47b directly or via springs to respective ends of the main link 48 in the above-described embodiment, so that the ratchet pawls 38 of the respective ratchet mechanisms 35a and 35b are pulled in forward or pushed forward from the rear side by distal end parts of the corresponding operating levers 47a and 47b. However, forward/reverse movement amounts of the movable support shafts 22a and 22b (movable bases 21a and 21b) at the base 12 sides of the respective crosslink mechanisms 13A and 13B per unit elevation/lowering amount of the workpiece support base 14 is extremely small in a region from the elevation limit height to a middle height of the workpiece support base 14 in comparison to a region from the middle height to the lowering limit height of the workpiece support base 14. The configuration illustrated by the embodiment described above, that is, the configuration with which the operating lever 47a or 47b at one side can be made to undergo a large motion based on a slight movement amount difference between the pair of right and left movable bases 21a and 21b thus enables the predetermined fall prevention movements to be performed reliably even when the elevation/lowering drive chain 30a or 30b breaks when the workpiece support base 14 is lowered in the region from the elevation limit height to the middle height.

The lifter according to the present invention can be put to practical use in an automotive vehicle assembly line, etc., as a means by which a conveyed object, placed and conveyed on a conveying traveling body, is changed in support height on the conveying traveling body.

What is claimed is:

1. A lifter comprising a workpiece support base, vertically movably supported on a base via a pair of parallel crosslink mechanisms, elevation/lowering drive chains, juxtaposed to the respective crosslink mechanisms and elevatingly and loweringly driving the workpiece support base, and fall prevention means, juxtaposed to the respective crosslink mechanisms, with the respective fall prevention means including ratchet gears, fixed to movement path flanks of movable support shafts, capable of horizontal movement, at base sides of the respective crosslink mechanisms, ratchet pawls, moving horizontally in interlock with the respective movable support shafts and being engaged with the ratchet gears by urging forces to deter lowering of the workpiece support base, and actuators, which, when the workpiece support base is lowered, switch and hold the respective ratchet pawls against the urging forces to and in unengaged orientations of being separated from the ratchet gears, a lowering process forcible fall prevention mechanism is provided, the lowering process forcible fall prevention mechanism includes a pair of operating levers and a link mechanism, the pair of operating levers switch the respective ratchet pawls in the unengaged orientations to engaged orientations of being engaged with the ratchet gears against driving forces of the actuators, the link mechanism is such that, when a difference arises in movement amounts of the respective movable support shafts during lowering of the workpiece support base, it converts the movement amount difference to an operating force of the operating lever at a larger movement amount side, and by the operating lever at one side being driven by the link mechanism, the operating lever switches the ratchet pawl at the larger movement amount side to the engaged orientation.

2. The lifter according to claim 1, wherein each of the ratchet pawls has a sensor juxtaposed thereto that detects that the ratchet pawl has been switched to the engaged orientation against the driving force of the actuator, and being configured so that stop lock of a driving motor of the elevation/lowering drive chains is executed based on the sensor at one side detecting that the corresponding ratchet pawl has been switched to the engaged orientation during the lowering of the workpiece support base.

3. The lifter according to claim 1, wherein the respective ratchet pawls and the operating levers operating the respective ratchet pawls are coupled to each other via springs and being configured so that the respective operating levers pull and switch the operation target ratchet pawls to the engaged orientations via the springs.

4. The lifter according to claim 1, wherein the movable support shafts at the base sides of the respective crosslink mechanisms are borne on a pair of movable bases that are supported on the base so as to be capable of moving horizontally respectively and separately, the operating levers are pivotally supported on the respective movable bases so as to be capable of swinging horizontally, and the link mechanism includes a single main link, disposed so as to extend across both of the movable bases and having two locations in a length direction thereof pivotally supported by the respective movable bases, and is configured so that, when the main link tilts horizontally due to the movement amount difference, a horizontal movement of an operation point, which, among operation points set at two locations of the main link that undergo motions in mutually opposite directions, is close to the movable base at the larger movement amount side, causes the operating lever on the movable base to operate.

5. The lifter according to claim 4, wherein the main link has its respective ends as the operation points, intermediate points further inward than the operation points at the respective ends are pivotally supported on the respective movable bases, the operating levers are, with respect to the movable support shafts on the respective movable bases and the ratchet pawls, pivotally supported at sides of the respective movable bases in the direction of movement during the lowering of the workpiece support base, the operation points at the respective ends of the main link are, with respect to the operating levers, disposed at sides at which the movable support shafts and the ratchet pawls are provided, transmission links, each of which transmits a movement of the corresponding operation point of the main link to the corresponding operating lever only when the operation point of the main link moves to approach the operating lever, are interposed between intermediate parts of the operating levers and the operation points at the respective ends of the main link, and free end parts of the operating levers are coupled to the ratchet pawls.

\* \* \* \* \*